US012100165B2

(12) United States Patent
Leong et al.

(10) Patent No.: US 12,100,165 B2
(45) Date of Patent: *Sep. 24, 2024

(54) OPTICAL SENSOR FOR ODOMETRY TRACKING TO DETERMINE TRAJECTORY OF A WHEEL

(71) Applicant: PixArt Imaging Inc., Hsin-Chu (TW)

(72) Inventors: Keen-Hun Leong, Penang (MY); Boon-How Kok, Penang (MY); Dennis Dominic Donald, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,021

(22) Filed: Jul. 17, 2023

(65) Prior Publication Data

US 2023/0386050 A1 Nov. 30, 2023

Related U.S. Application Data

(63) Continuation of application No. 17/509,056, filed on Oct. 24, 2021, now Pat. No. 11,748,893, which is a
(Continued)

(51) Int. Cl.
*G06T 7/20* (2017.01)
*B60W 30/00* (2006.01)
(Continued)

(52) U.S. Cl.
CPC ............. *G06T 7/20* (2013.01); *B60W 30/00* (2013.01); *B62D 15/024* (2013.01); *G01C 22/00* (2013.01);
(Continued)

(58) Field of Classification Search
CPC ............. G06T 7/20; G06T 2207/30241; G06T 2207/30252; B60W 30/00; B62D 15/024; G01C 22/00; G01C 25/00; G01C 21/26; G06F 3/0362; H04N 23/90; G01P 3/486; G01P 3/36; G05D 1/0253; G05D 1/0246; G05D 1/0272; G05B 2219/40572;
(Continued)

(56) References Cited

U.S. PATENT DOCUMENTS 5,020,903 A 6/1991 Sakai
5,719,497 A 2/1998 Veeser
(Continued)

FOREIGN PATENT DOCUMENTS

CN 1536525 A 10/2004
CN 102365526 A 2/2012

*Primary Examiner* — Jose L Couso
(74) *Attorney, Agent, or Firm* — Winston Hsu

(57) ABSTRACT

An optical sensor system for determining trajectory of a wheel includes: a wheel mounted in a wheel arch having an outer surface covered with evenly-spaced wheel treads; an optical sensor mounted in the wheel arch but not touching the wheel, for performing a plurality of counts corresponding to respectively capturing a plurality of images of the wheel according to the wheel treads, and comparing the captured images with a reference image to determine a 2D displacement. The optical sensor further performs a calculation to convert the measured 2D displacement of the wheel from its original position into a distance the wheel travels along a path in order to determine the wheel trajectory.

14 Claims, 5 Drawing Sheets

Related U.S. Application Data continuation of application No. 16/831,825, filed on Mar. 27, 2020, now Pat. No. 11,189,036, which is a continuation of application No. 16/140,444, filed on Sep. 24, 2018, now Pat. No. 10,643,335, which is a continuation of application No. 14/930,668, filed on Nov. 3, 2015, now Pat. No. 10,121,255.

(51) Int. Cl.
| | |
|---|---|
| *B62D 15/02* | (2006.01) |
| *G01C 22/00* | (2006.01) |
| *G01C 25/00* | (2006.01) |
| *G06F 3/0362* | (2013.01) |
| *H04N 23/90* | (2023.01) |
| *G01C 21/26* | (2006.01) |

(52) U.S. Cl.
CPC ............ *G01C 25/00* (2013.01); *G06F 3/0362* (2013.01); *H04N 23/90* (2023.01); *G01C 21/26* (2013.01); *G06T 2207/30241* (2013.01); *G06T 2207/30252* (2013.01)

(58) Field of Classification Search
CPC .......... G01B 3/12; G01B 5/26; G01B 11/275; G06V 20/586; G06K 9/00812; G01M 17/027

See application file for complete search history.

(56) References Cited

U.S. PATENT DOCUMENTS

| | | | |
|---|---|---|---|
| 7,655,897 | B2 | 2/2010 | Lim |
| 8,373,110 | B2 | 2/2013 | Fang |
| 9,360,300 | B2 | 6/2016 | DiBernado |
| 2002/0124424 | A1* | 9/2002 | Airey .................. G01B 3/12 33/124 |
| 2004/0210343 | A1 | 10/2004 | Kim |
| 2004/0221790 | A1 | 11/2004 | Sinclair |
| 2006/0149425 | A1* | 7/2006 | Davis .................. G01C 3/08 701/1 |
| 2009/0128364 | A1 | 5/2009 | Lee |
| 2010/0302158 | A1 | 12/2010 | Fang |
| 2012/0016629 | A1 | 1/2012 | Kishikawa |
| 2015/0196804 | A1 | 7/2015 | Koduri |
| 2016/0144505 | A1 | 5/2016 | Fong |
| 2016/0144511 | A1 | 5/2016 | Romanov |
| 2016/0147230 | A1 | 5/2016 | Munich |
| 2016/0378181 | A1 | 12/2016 | Nasca |

\* cited by examiner

OPTICAL SENSOR FOR ODOMETRY TRACKING TO DETERMINE TRAJECTORY OF A WHEEL

CROSS REFERENCE TO RELATED APPLICATIONS

This application is a continuation application of U.S. application Ser. No. 17/509,056, filed on Oct. 24, 2021, which is a continuation application of U.S. application Ser. No. 16/831,825, filed on Mar. 27, 2020, which is a continuation application of U.S. application Ser. No. 16/140,444, filed on Sep. 24, 2018, which is a continuation application of U.S. application Ser. No. 14/930,668, filed on Nov. 3, 2015. The contents of these applications are incorporated herein by reference.

BACKGROUND OF THE INVENTION

1. Field of the Invention

The present invention relates to optical sensors, and more particularly, to an optical sensor which can be used to perform odometry tracking.

2. Description of the Prior Art

Optical sensors, such as those commonly used in a computer mouse, can detect miniscule changes in direction in order to track the motion of an object over a 2D surface. Optical sensors work by illuminating the surface on which the object moves to capture an image, and comparing a reference image and the captured image in order to determine how far from the origin the object has moved. This image comparison generates accumulated delta y and delta x values; computer algorithms can then be used to determine the resultant motion of the object.

The advantage of optical sensors is that only a single sensor is needed to determine angular motion, as the optical sensor can generate both delta x and delta y values. Optical sensors are typically used in applications where only small distances need to be determined, however. If an optical sensor could be implemented in an application which moves via the use of wheels, the optical sensor could track the motion of the wheels and then convert the detected motion to real-life distance.

It is therefore an objective of the present invention to employ a single optical sensor for tracking motion of a wheel in order to perform distance and odometry tracking.

SUMMARY OF THE INVENTION

An optical sensor system for determining trajectory of a wheel comprises: a wheel mounted in a wheel arch having an outer surface covered with evenly-spaced wheel treads; an optical sensor mounted in the wheel arch but not touching the wheel, for performing a plurality of counts corresponding to respectively capturing a plurality of images of the wheel according to the wheel treads, and comparing the captured images with a reference image to determine a 2D displacement. The optical sensor further performs a calculation to convert the measured 2D displacement of the wheel from its original position into a distance the wheel travels along a path in order to determine the wheel trajectory.

A method for determining trajectory of a wheel comprises: mounting a wheel in a wheel arch, the wheel having an outer surface covered with evenly-spaced wheel treads; utilizing an optical sensor mounted in the wheel arch but not touching the wheel to perform the following steps: capturing a plurality of images of the wheel according to the wheel treads to generate a plurality of counts, respectively; comparing the captured images with a reference image to determine a 2D displacement of the wheel; and performing a calculation to convert the measured 2D displacement of the wheel from its original position into a distance the wheel travels along a path in order to determine the wheel trajectory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
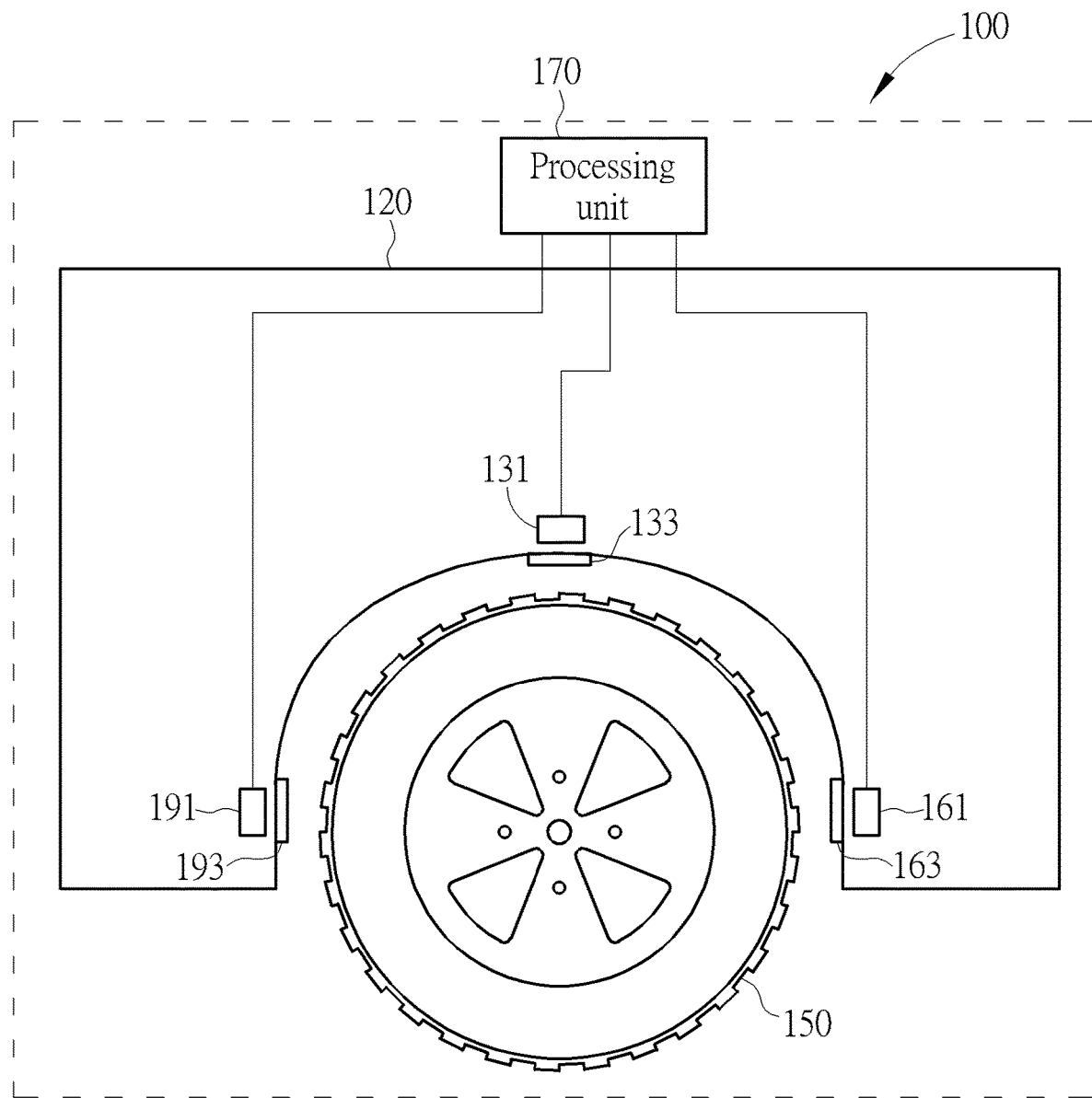
FIG. 1 is an illustration of an optical sensor mounted above a wheel.

An exemplary embodiment of the present invention uses an optical sensor positioned above a wheel, as illustrated in FIG. 1. The odometry tracking system 100 comprises a wheel 150 mounted in a wheel arch 120. Three optical sensors 131, 161 and 191 are illustrated in the diagram, being positioned at the top of the wheel arch, at the right side of the wheel arch and at the left side of the wheel arch, respectively. Each optical sensor is protected by a respective casing 133, 163, and 193. It is noted that an exemplary embodiment of the present invention only requires a single optical sensor of the illustrated optical sensors 131, 161, 191 in order to perform odometry tracking. The three sensors are illustrated in order to give examples as to possible placement, but not to limit the invention.

The casings 133, 163, 193 are provided in order to protect the respective optical sensor 131, 161, 191 from damage. These casings can be clear housings that are flush with the wheel arch 120 or protrude. The aim of the casings 133, 163, 193 is to protect the optical sensor 131, 161, 191 from damage. Further, when the optical sensor 131, 161, 191 is used to determine motion of a wheel in a car, the casing 133, 163, 193 can also protect it from splashes etc.

By using one of the optical sensors 131, 161, 191, an accurate determination of how far the wheel 150 has travelled, as well as the trajectory of the wheel 150, can be estimated. As detailed above, the optical sensors 131, 161, 191 are mounted on the top of the wheel arch 120. The wheel arch 120 could be a wheel arch of a motorized vehicle such as a car, or a wheel arch in a treadmill. As the wheel 150 rotates, the optical sensors 131, 161, 191 generate reports based on a number of treads which are imaged.

Figure 2A:
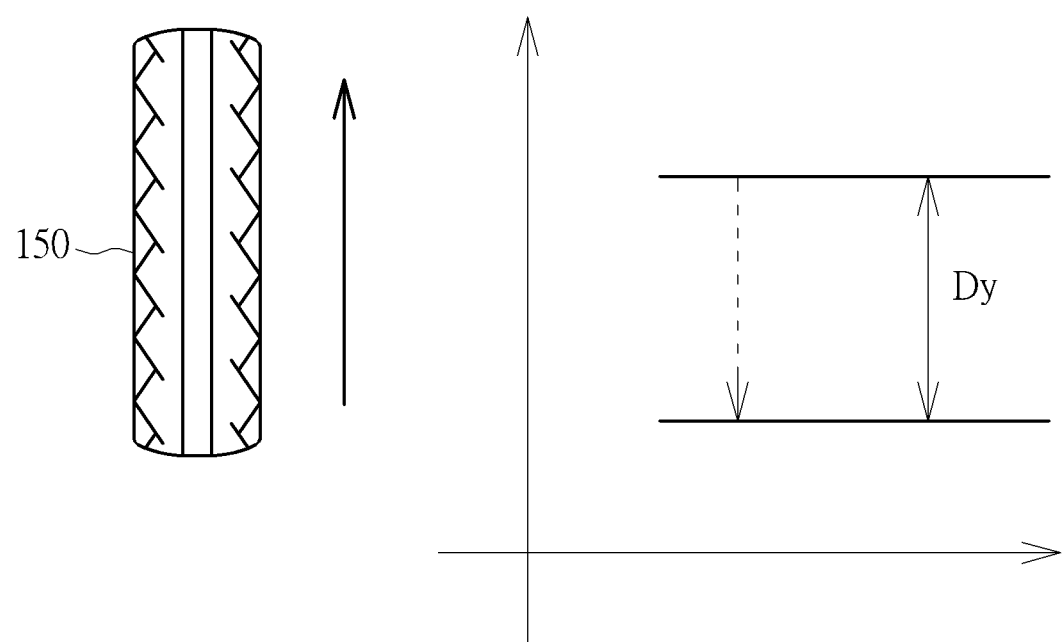
FIG. 2A is an illustration of accumulated motion generated by a wheel moving in a straight direction.
Figure 2B:
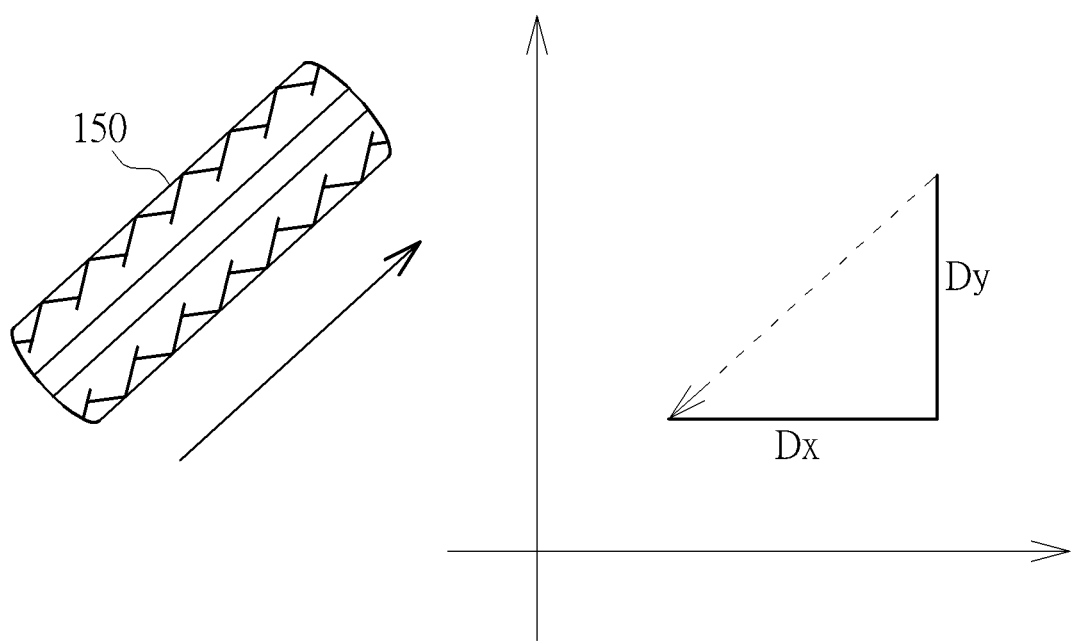
FIG. 2B is an illustration of accumulated motion generated by a wheel moving in an angular direction.

Refer to FIG. 2A and FIG. 2B, which illustrate how the reports/counts of the optical sensor generate accumulated motion parameters. FIG. 2A illustrates the generated accumulated motion when the wheel 150 rotates without turning. As shown in the diagram, no x values are generated but y values are generated in the opposite direction from the wheel motion. These accumulated values can be termed Dy.

FIG. 2B illustrates the generated accumulated motion when the wheel 150 rotates and turns at the same time. As shown in the diagram, both x and y values are generated in the opposite direction from the wheel motion. In order to determine the resultant distance of the wheel 150, the hypotenuse of Dx and Dy must be calculated. This value can then be translated into a real-world distance.

A calibration step generates a ratio that can be used for conversion. The calibration process is performed to calculate how far the wheel turns for each count of the sensor. As noted above, the count corresponds to a sensor tread of the sensor. Assuming the wheel rotates as illustrated in FIG. 2A, then it can be calculated how far in real terms the wheel turns because the circumference, C, of the wheel is a known value.

The circumference of the wheel can be calculated using the Pythagorean equation: C=2πr As the wheel rotates, delta y values are accumulated until Dy corresponds to one rotation of the wheel. The accumulated value Dy has a direct relationship to C. It is determined how many reports/counts there are in Dy, and this value is used to divide the circumference C in order to generate a distance per count (dpc). This is illustrated by the following equation:

$$dpc = \frac{C}{Dy} = \frac{2\pi r}{Dy} \quad (1)$$

Figure 3A:
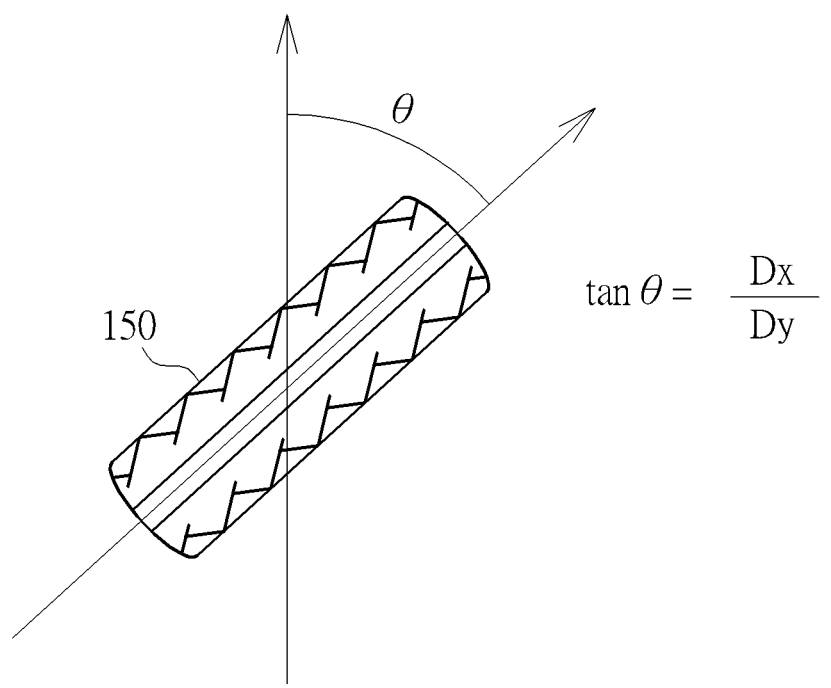
FIG. 3A is an illustration of generated angular motion of the wheel illustrated in FIG. 2.

A trajectory of the wheel 150 is then determined. If the optical sensor 131, 161, 191 only plots a change in the y direction, i.e. only delta y values are generated, then the wheel 150 is determined to be rotating without turning and a simple conversion of counts can be used to generate the distance travelled by the wheel 150. If, however, the wheel 150 is both turning and rotating then the angle θ of the wheel turn can be calculated using simple trigonometry, as illustrated in FIG. 3A and shown by the following equation:

$$\tan\theta = \frac{Dx}{Dy} \quad (2)$$

Figure 3B:
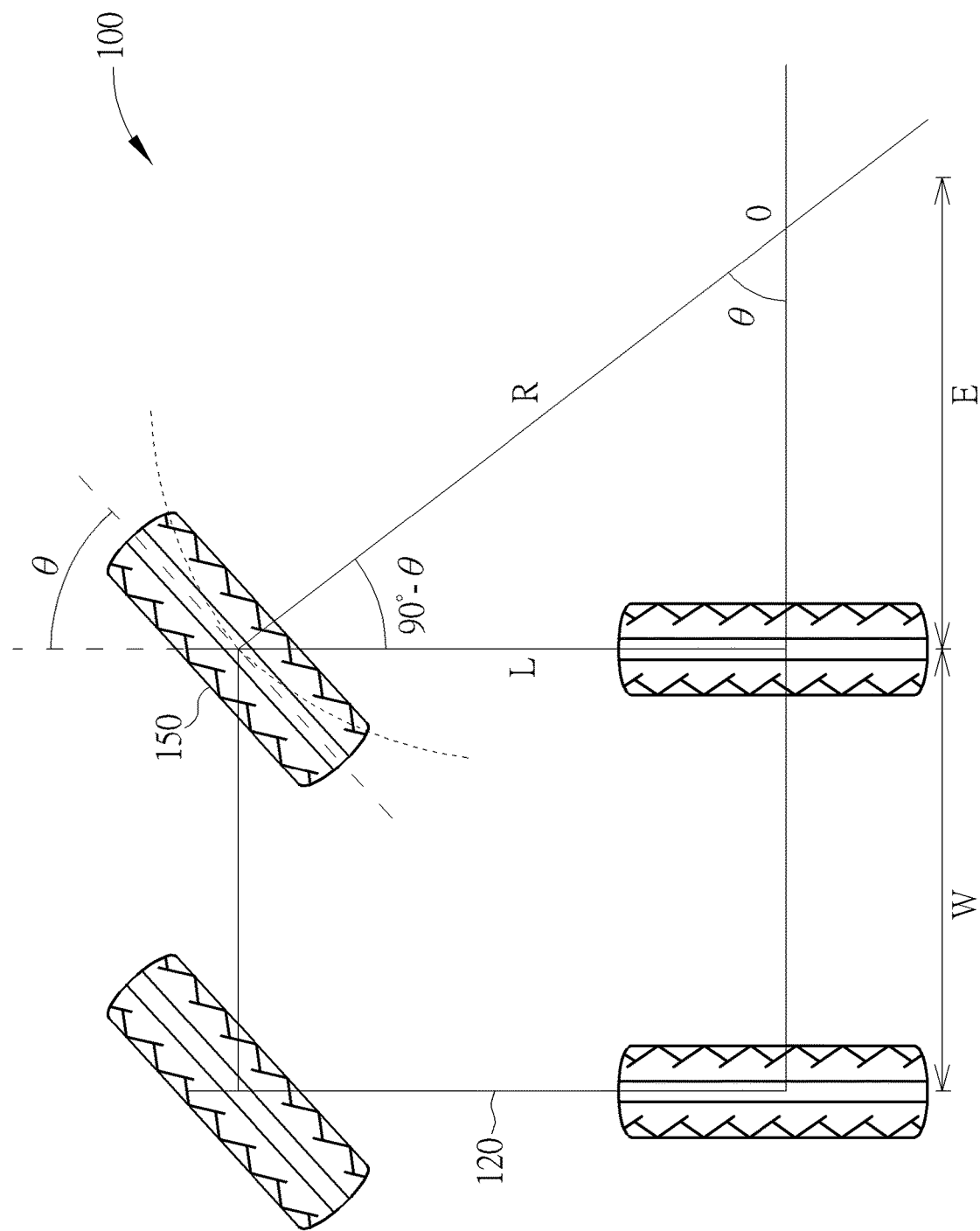
FIG. 3B is an illustration of trajectory of the wheel illustrated in FIG. 2 being the front wheel of a car.

Once the turning angle of the wheel 150 is determined, a trajectory of the wheel 150 can be plotted, as illustrated in FIG. 3B. FIG. 3B is a diagram of the odometry system 100 being a car with four wheels. The front right-hand wheel is the wheel 150 illustrated in FIG. 3B. As the turning angle θ of the wheel 150 is known, the internal angle between the wheel and the side of the car can be calculated by using right angles i.e. 90°−θ.

A perpendicular line to the turned wheel 150 will intersect with an extended line from the rear axles of the car 100 to form a right-angled triangle having sides L, R and E. L is the length of the car 100 and therefore is a known value. Using trigonometry, the length of R and E can be calculated, as illustrated by the following equations:

$$R = \frac{L}{\sin\theta} \quad (3)$$

$$E = \frac{L}{\cos\theta} \quad (4)$$

As illustrated by the dotted lines, the car 100 will move along a curve having a radius R from point O. By using the optical sensor 131, 161, 191 to determine a rotated distance of the wheel 150 and converting that distance into real-world values, a total distance d moved along the curve by the car 100 can be calculated.

As detailed above, a distance per count has been calculated in the calibration stage. This value can be used to calculate a real distance taken by the vehicle 100. When the vehicle 100 moves in a straight direction i.e. no change in x, the values can be directly put into equation (1) by multiplying a number of counts (treads) with the distance per count. In effect, this converts a distance monitored by the optical sensor 131, 161, 191 into a real distance. This is shown below as equation (5):

$$\text{Distance} = Dy \times dpc$$

If the vehicle 100 is turning, the displacement measured by the optical sensor 131, 161, 191 is calculated number by using the hypotenuse of Dx and Dy. This value is then converted into counts, and is multiplied with the value dpc to determine a distance travelled along the curve. This is shown below as equation (6):

$$\text{Distance} = \sqrt{Dx^2 + Dy^2} \times dpc$$

The final stage in the calculation places this determined distance on the curve calculated in FIG. 3B. In this way, a trajectory of a wheel can be calculated to high accuracy.

Although the above is described using a car as an exemplary embodiment, it should be appreciated that the concept can be applied to any application which tracks the motion of a wheel. Further, the optical sensor can also be calibrated to determine a vertical distance from the wheel, so that if air pressure of the wheel changes or some other factors cause the distance between the optical sensor and the wheel to change (the vehicle moves over rocky terrain, for example) the change in distance can be compensated for.

No matter what implementation the optical sensor is applied to, the wheel radius should be set as a known parameter in an initialization procedure. In the example provided in FIG. 3B, the length of the car L and the distance between the rear axles W will be known values and can also be set as the initialization parameters. This is not a limitation of the invention.

To summarize, the present invention provides an optical sensor which can utilize changes in 2D motion of a wheel to determine angular motion of the wheel. By plotting a trajectory of the wheel using the determined change in motion, a distance the wheel moves along said trajectory can also be determined.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor system for determining trajectory of a wheel, the optical sensor system comprising:
a wheel mounted in a wheel arch having an outer surface covered with evenly-spaced wheel treads;
a first optical sensor mounted in the wheel arch on a first side of the wheel but not touching the wheel, for performing a plurality of counts corresponding to respectively capturing a plurality of images of the wheel according to the wheel treads, and for comparing the captured images with a reference image to determine a 2D displacement; and a second optical sensor mounted in the wheel arch on a second side of the wheel opposite to the first side of the wheel but not touching the wheel, for performing a plurality of counts corresponding to respectively capturing a plurality of images of the wheel according to the wheel treads, and for comparing the captured images with a reference image to determine a 2D displacement;

wherein each optical sensor further performs a calculation to convert the measured 2D displacement of the wheel from its original position into a distance the wheel travels along a path in order to determine the wheel trajectory.

2. The optical sensor system of claim 1, wherein each optical sensor first performs a calibration process by measuring a 2D displacement of the wheel corresponding to a single rotation of the wheel, determines how many counts are performed according to this single rotation, then utilizes a circumference of the wheel to determine a distance per count (dpc) value, wherein the dpc value is used to convert the measured 2D displacement into a distance the wheel travels along a path.

3. The optical sensor system of claim 2, wherein the calibration process is performed when the wheel rotates but does not turn.

4. The optical sensor system of claim 1, wherein each optical sensor determines the wheel trajectory by calculating a turning degree of the wheel according to a trigonometric manipulation of the captured 2D displacement, and utilizes the calculated turning degree and at least one other parameter of the optical sensor system to determine a turning curve along which the wheel moves.

5. The optical sensor system of claim 4, being a car, wherein the at least one other parameter of the optical sensor system is a distance between a front wheel axle and a rear wheel axle of the car, and the turning curve is centered on a point where an extended line from the rear axle crosses a perpendicular line to the front axle.

6. The optical sensor system of claim 1, being a treadmill.

7. A method for determining trajectory of a wheel, the method comprising:

mounting a wheel in a wheel arch, the wheel having an outer surface covered with evenly-spaced wheel treads;

utilizing a first optical sensor mounted in the wheel arch on a first side of the wheel but not touching the wheel and a second optical sensor mounted in the wheel arch on a second side of the wheel opposite to the first side of the wheel but not touching the wheel to perform the following steps:

capturing a plurality of images of the wheel according to the wheel treads to generate a plurality of counts, respectively;

comparing the captured images with a reference image to determine a 2D displacement of the wheel; and performing a calculation to convert the measured 2D displacement of the wheel from its original position into a distance the wheel travels along a path in order to determine the wheel trajectory.

8. The method of claim 7, wherein each optical sensor first performs a calibration process comprising the following steps:

measuring a 2D displacement of the wheel corresponding to a single rotation of the wheel;

determining how many counts are performed according to this single rotation; and utilizing a circumference of the wheel to determine a distance per count (dpc) value;

wherein the dpc value is used to convert the measured 2D displacement into a distance the wheel travels along a path.

9. The method of claim 8, wherein the calibration process is performed when the wheel rotates but does not turn.

10. The method of claim 7, wherein the step of determining the wheel trajectory comprises:

calculating a turning degree of the wheel according to a trigonometric manipulation of the captured 2D displacement; and utilizing the calculated turning degree and at least one other parameter to determine a turning curve along which the wheel moves.

11. The method of claim 10, being used in a car, wherein the at least one other parameter is a distance between a front wheel axle and a rear wheel axle of the car, and the turning curve is centered on a point where an extended line from the rear axle crosses a perpendicular line to the front axle.

12. The method of claim 7, being used in a treadmill.

13. A car navigation system, comprising:

a car, comprising:

a wheel mounted in a wheel arch of the car; and a first optical sensor mounted in the wheel arch on a first side of the wheel but not touching the wheel and a second optical sensor mounted in the wheel arch on a second side of the wheel opposite to the first side of the wheel but not touching the wheel, for capturing a plurality of images of the wheel, and comparing the captured images to determine a 2D displacement;

wherein each optical sensor further performs a calculation to convert the measured 2D displacement of the wheel from its original position into a distance the wheel travels along a path in order to determine the wheel trajectory.

14. The car navigation system of claim 13, wherein the wheel has an outer surface covered with evenly-spaced wheel treads, and the plurality of images are captured according to the wheel treads.

* * * * *